United States Patent [19]
Gurner et al.

[11] Patent Number: 5,459,312
[45] Date of Patent: Oct. 17, 1995

[54] ACTION APPARATUS AND METHOD WITH NON-CONTACT MODE SELECTION AND OPERATION

[75] Inventors: Asaf Gurner; Oded Y. Zur, both of Los Angeles, Calif.

[73] Assignee: Interactive Light Inc., Santa Monica, Calif.

[21] Appl. No.: 195,775

[22] Filed: Feb. 14, 1994

Related U.S. Application Data

[63] Continuation-in-part of Ser. No. 177,904, Jan. 6, 1994, Pat. No. 5,414,256, which is a continuation-in-part of Ser. No. 1,058, Jan. 6, 1993, which is a continuation-in-part of Ser. No. 776,669, Oct. 15, 1991, abandoned.

[30] Foreign Application Priority Data

Feb. 19, 1992 [IL] Israel .................................... 101016

[51] Int. Cl.⁶ .................................................. G01V 9/04
[52] U.S. Cl. ...................... 250/221; 345/156; 273/148 B
[58] Field of Search ......................... 250/221, 222.1, 250/222.2; 340/706, 708, 555, 556, 557; 364/410; 84/639; 345/156, 163, 166, 175; 273/148 B

[56] References Cited

U.S. PATENT DOCUMENTS

| 4,590,410 | 5/1986 | Jönsson | 250/221 |
| 5,045,687 | 9/1991 | Gurner | 250/221 |
| 5,254,853 | 10/1993 | Reich | 250/222.1 |

Primary Examiner—Edward P. Westin
Assistant Examiner—Que T. Le
Attorney, Agent, or Firm—Kirschstien et al.

[57] ABSTRACT

An action apparatus generates lights and sounds in response to hand positions above a trio of housings. The apparatus has different operational modes, any one of which is remotely selectable at a distance from, and in a non-contact relationship with, the housing.

26 Claims, 15 Drawing Sheets

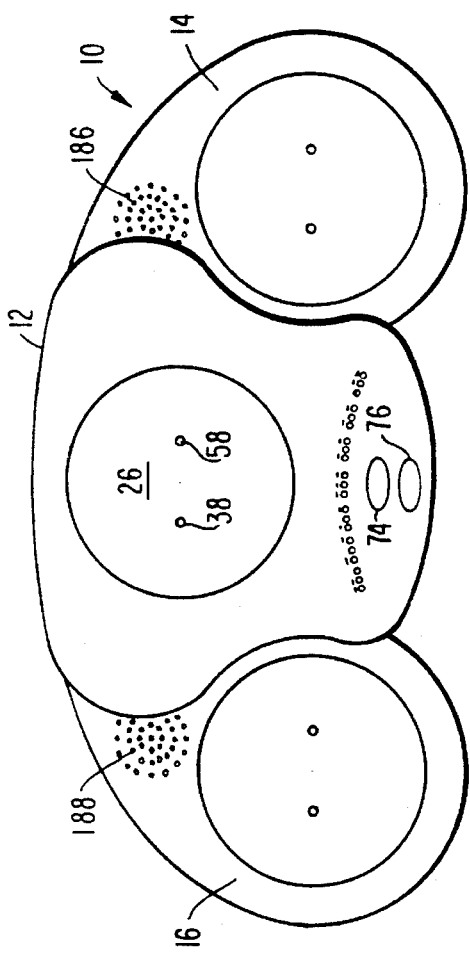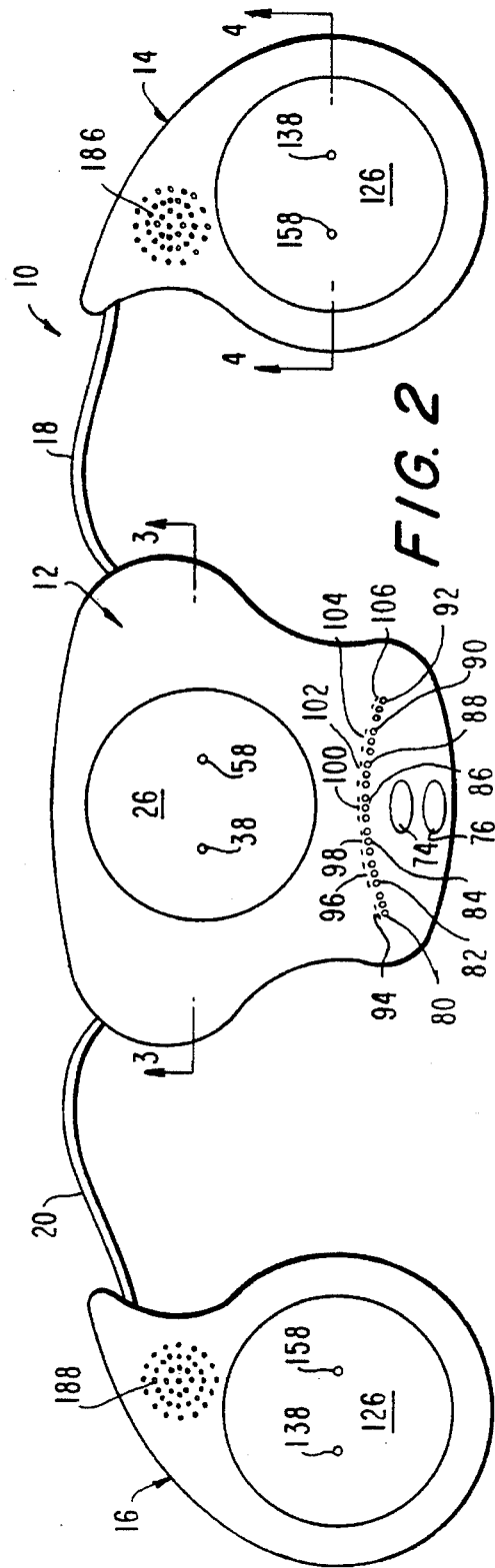

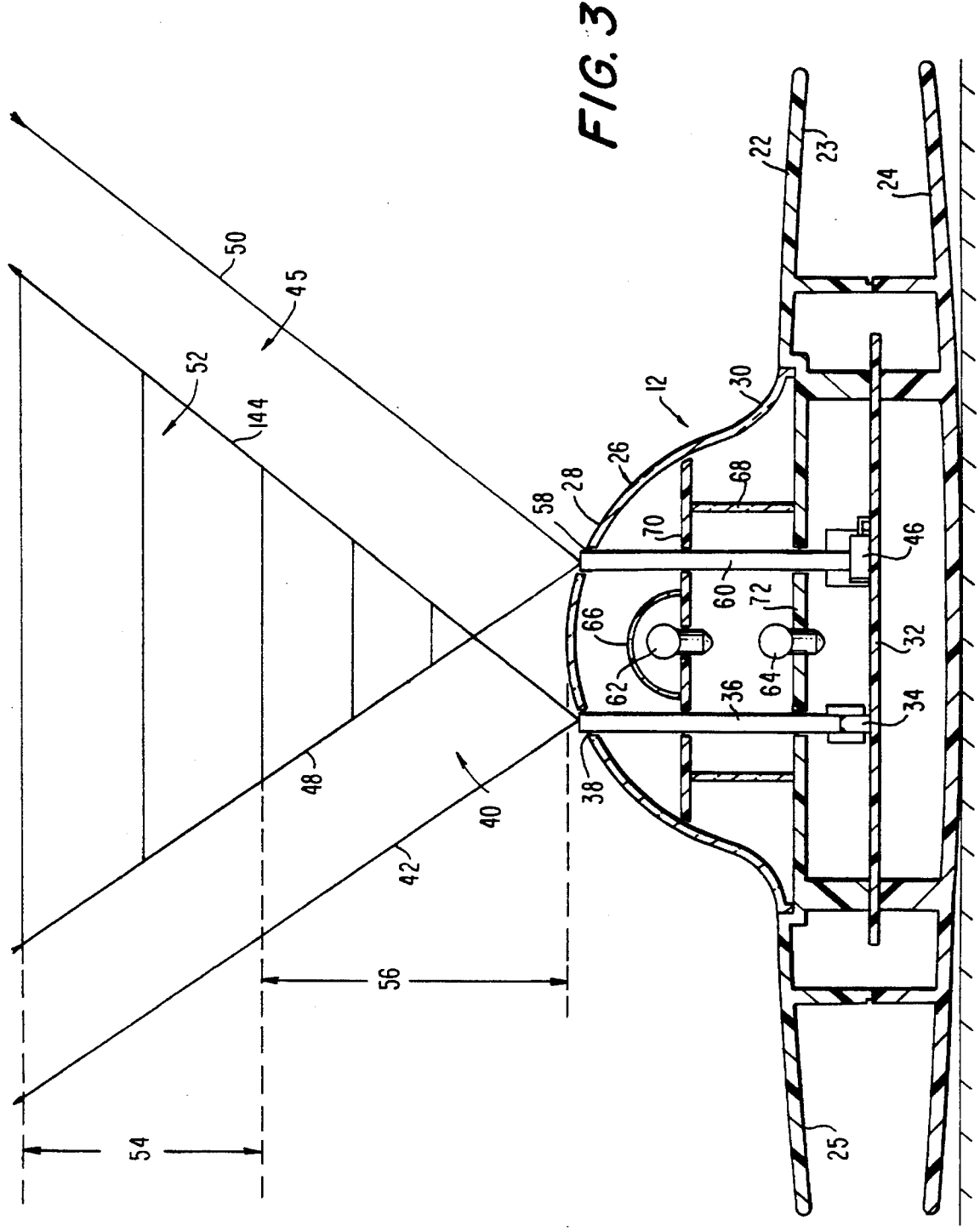

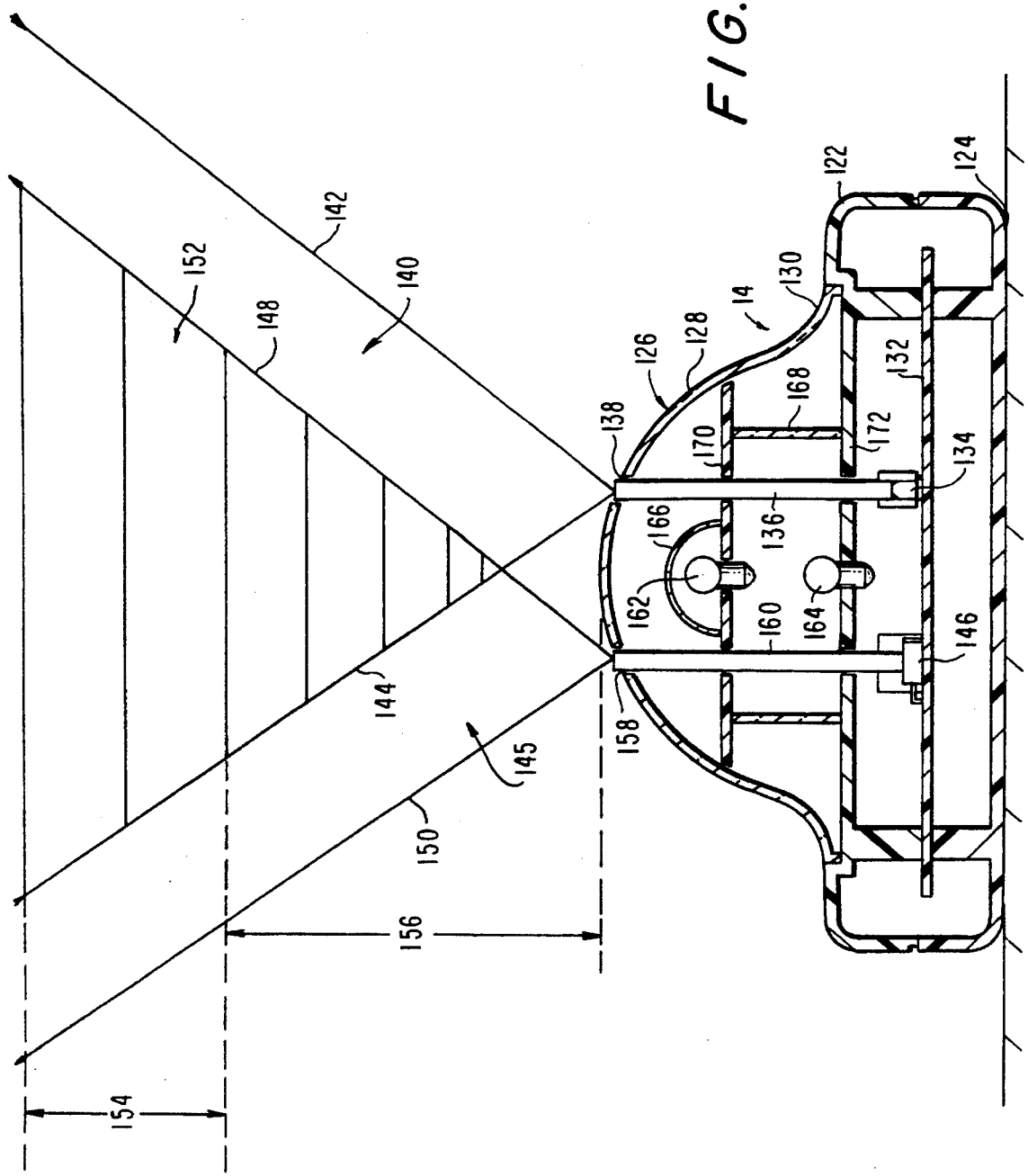

| LINE | PRESET SEQUENCES |
|---|---|
| 1 | 1 |
| 2 | 1,2 |
| 3 | 1,2,6 |
| 4 | 1,2,6,1+3 |
| 5 | 1,2,6,1+3,4 |
| 6 | 1,2,6,1+3,4,1+5 |

(WINNING SOUND GENERATED)

(NOTE THAT 1+3 AND 1+5 ARE COMBINATION MOVES)

ACTION APPARATUS AND METHOD WITH NON-CONTACT MODE SELECTION AND OPERATION

CROSS-REFERENCE TO RELATED APPLICATIONS

This application is a continuation-in-part of our U.S. patent application Ser. No. 08/177,904, filed Jan. 6, 1994, now U.S. Pat. No. 5,414,256, which, in turn, is a continuation-in-part of our U.S. patent application Ser. No. 08/001,058, filed Jan. 6, 1993, which, in turn, is a continuation-in-part of U.S. patent application Ser. No. 07/776,669, filed Oct. 15, 1991, now abandoned.

BACKGROUND OF THE INVENTION

1. Field of the Invention

This invention generally relates to an action apparatus for, and a method of, detecting an object, such as a user's hand, in free space, and for producing, in a plurality of operational modes, different light and/or sound sequences indicative of the location of the object relative to, and in a non-contact relationship with, a support, and, still more particularly, to selecting, in advance, a particular operational mode in a non-contact manner with the support.

2. Description of Related Art

Apparatus for producing audible tones and video images are known, for example, from U.S. Pat. No. 5,045,687, in which a user's hand, when placed in a region in which a light beam overlaps with the field of view of a sensor, is detected to generate an electrical signal which, in turn, is processed, typically by a microprocessor, to generate a corresponding tone and/or image.

It is also known, particularly in the field of toys, to generate different light and/or sound sequences with an on-board microprocessor having multiple modes of operation. However, changing modes, or playing with the toy, involves making contact with the toy, typically by using one's finger to depress a button or key. Experience has shown that such known toys are popular amusements, and it would be desirable to increase their play value by enabling the selection of a playing mode, as well as the playing of the toy itself, to be accomplished without touching the toy, thereby lending an air of mystery and excitement.

SUMMARY OF THE INVENTION

Objects of the Invention

It is a general object of this invention to remotely select one of a plurality of different operational modes of an apparatus for detecting an object in free space without making contact with the apparatus itself.

Another object of this invention is to generate light and/or sound sequences by moving an object relative to, and out of contact with, a support.

Still another object of this invention is to increase the play value and excitement level of microprocessor-based toys that generate light and/or sound sequences to be emulated by a user.

Features of the Invention

In keeping with these objects and others which will become apparent hereinafter, one feature of this invention resides, briefly stated, in an action apparatus for, and a method of, detecting an object in free space, comprising a support; means supported by the support, for operating the apparatus to detect the object in different operational modes; and means for remotely selecting one of the modes at a distance from, and in a non-contact relationship with, the support.

In the preferred embodiment, the operating means includes emitter means, e.g., a light source, for transmitting a light beam away from the support into an emission space. The operating means further includes sensor means, e.g., a photodetector, having a sensing space or field of view that at least partially overlaps the emission space in an overlapping region. The detector receives light directed by the object, e.g., a user's hand, located in the overlapping region, and generates an electrical signal indicative of the presence of the object in the overlapping region.

The operating means further includes means for processing the electrical signal to generate one of a first control signal indicative of a first range of distances of the object from the support, and a second control signal indicative of a second range of distances of the object from the support. Indicator means are responsive to the generation of the different control signals for indicating the presence of the object. Advantageously, the indicator means includes differently colored, visible lights and differently pitched, acoustic sounds.

In the preferred embodiment, the support includes three housings, namely a master housing and a pair of slave housings, each housing having a pair of exit and entrance ports. The emitter means includes three infrared light sources, one on each housing, for emitting three light beams through respective exit ports into respective emission spaces above the respective housings. The sensor means includes three infrared light detectors, one on each housing, having respective sensing spaces, (i.e., fields of view) above the respective housings. The sensing spaces at least partially and, in the preferred embodiment, substantially, overlap the respective emission spaces in respective overlapping regions. Each detector is operative for detecting light from a respective light beam reflected off an object, i.e., a user's hand, located in a respective overlapping region. The detectors are operative for generating different electrical signals. The indicator means includes three indicating assemblies, one on each housing, for generating different indications, e.g., lights and sounds, in response to the generation of the different electrical signals.

In all modes of operation, the placement of one's hand, for example, in an overlapping region, generates a distinctive light and sound for that overlapping region. Moreover, the distance that one's hand is located relative to the support in upper and lower zones of an overlapping region generates the aforementioned first and second control signals which, as noted above, in turn, generates a distinctive light and sound for said first and second range of distances. Hence, there are six different colored lights with concomitant generation of six different audible tones.

There are various pre-programmed modes of operation. For example, in a first operational mode, the processing means allows a user to play freely, i.e., sounds and lights of his or her choice are generated as the user penetrates the various six zones. In another operational mode, the processing means stores progressive sequences of the different sounds and lights, and generates a success signal when the last sequence is successfully emulated by a user. In still another operational mode, the processing means generates a predetermined sequence of lights and sounds, and generates a success signal when the predetermined sequence is successfully emulated. In another operational mode, the processing means and the user take turns generating various lights and sounds, and the processing means generates a success signal when the last sequence is successfully emulated by the user. In still another operational mode, the last sequence is repeated when the last sequence is not successfully emulated by the user. In yet another operational mode, the last sequence is cleared when the last sequence is not successfully emulated within a predetermined time period.

Prior to operating the apparatus in any of the aforementioned operational modes, any particular mode is itself selected by having the user position his or her hand in one zone and, preferably, in a pair of zones, in the various overlapping regions. The processing means includes a preprogrammed microprocessor operative for recognizing whether a user's hands are in the correct positions relative to, and spaced from, the support and, upon such recognition, the microprocessor selects the mode. Visual aids on the support, e.g., the master housing, prompts the user to position his or her hands in the correct position for each operational mode.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a top plan view of an action apparatus in accordance with a preferred embodiment of this invention in a storage position;

FIG. 2 is a top plan view of the apparatus of FIG. 1 in a play position;

FIG. 3 is an enlarged sectional view taken on line 3—3 of FIG. 2;

FIG. 4 is an enlarged sectional view taken on line 4—4 of FIG. 2;

DETAILED DESCRIPTION OF THE PREFERRED EMBODIMENT

Figure 5:
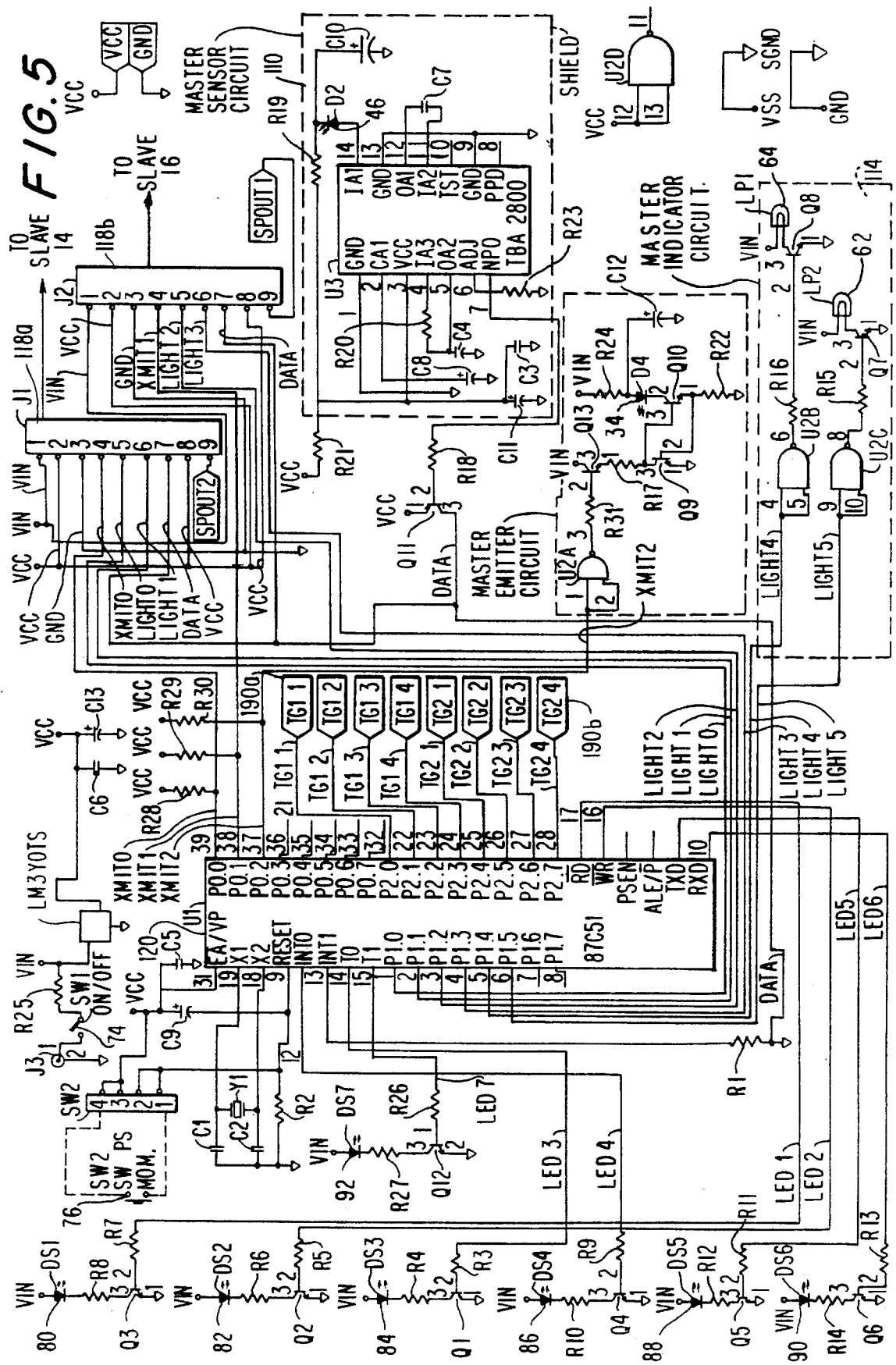
FIG. 5 is a detailed electrical schematic diagram of the electronic circuitry within a master housing of the apparatus of FIG. 1.

Referring now to the drawings, reference numeral 10 generally identifies an action apparatus or toy having a countertop support composed of three sections, namely a master housing 12 and a pair of slave housings 14, 16. As best seen in FIG. 1, the slave housings 14, 16 are at least partially received and stored in the master housing prior to use. In use, as shown in FIG. 2, the slave housings 14, 16 are pulled out from their stored positions to opposite sides of the master housing 12 to a play position, and are in electrical communication with the circuitry on-board the master housing via flexible electrical wires 18, 20. Such wires could, of course, be replaced with wireless transceivers within the housings for even greater freedom of movement.

FIG. 3 depicts a cross-section through the master housing 12, while FIG. 4 depicts a cross-section through the slave housing 14. The slave housings 14, 16 are mirror symmetrical and identical so that a description of slave housing 14 is sufficient for an understanding of this invention.

As best shown in FIG. 3, the master housing 12 includes upper and lower, molded plastic, housing portions 22, 24 having side compartments into which the slave housings 14, 16 are stored. A light-transmissive, plastic dome 26 having upper and lower dome portions 28, 30 is centrally mounted on the upper housing portion 22. A printed circuit board 32 is mounted within the housing below the dome 26. An emitter means, preferably an infrared light diode transmitter 34, is mounted on the board 32 and is operative for launching an infrared light beam into and along a light column 36, e.g., an optical fiber, through an exit port 38 in the dome for emission as a wide angle beam into a generally conical emission space 40 bounded by imaginary lines 42, 44 above the dome. A sensor means, preferably an infrared light diode receiver or detector 46, is also mounted on the board 32, and has a field of view or generally conical sensing space 45 bounded by imaginary lines 48, 50. The sensing space 45 overlaps the emission space 40 at overlapping region 52 that has upper and lower zones 54, 56. In the preferred embodiment, the lower zone 56 extends from slightly above the top of the dome to a distance of about six inches above the dome, while the upper zone 54 extends from about six inches to about twelve inches above the dome.

As explained below, an object, typically a human hand, located anywhere in the overlapping region 52 will reflect light emitted from the light source 34 to an entrance port 58 mounted on the dome alongside the exit port 38, and then along another light column 60, e.g., another optical fiber, to the light detector 46. The detector 46 generates an electrical signal indicative of the presence of the object in the overlapping region and, thereupon, the electrical signal is processed into a control signal. Each zone 54, 56 of the overlapping region 52 has its own distinct electrical signal and control signal. Each control signal is used for driving an indicating assembly which, as illustrated, has upper and lower lamps or lights 62, 64 mounted at upper and lower elevations within the master housing 12. Upper and lower filters 66, 68 of different colors respectively surround the upper and lower lights 62, 64. Note that when lower light 64 is lit, the light passes through filter 68 and illuminates only the lower dome portion 30, the upper dome portion 28 being screened by an upper, opaque light baffle 70 on which the upper light 62 is mounted. The lower light 64 is mounted on a lower, opaque light baffle 72. Also, when upper light 62 is lit, the light passes through filter 66 and illuminates only the upper dome portion 30, the lower dome portion being screened by the light baffle 70.

Turning now to FIG. 4, each slave housing includes upper and lower, molded plastic, housing portions 122, 124. A light-transmissive plastic dome 126 having upper and lower dome portions 128, 130 is centrally mounted on the upper housing portion 122. A printed circuit board 132 is mounted within the housing below the dome 126. An emitter means, identical to the aforementioned emitter means 34, includes an infrared light diode transmitter 134 mounted on the board 132 and operative for launching an infrared light into and along a light column 136, e.g., an optical fiber, through an exit port 138 in the dome 126 for emission as a wide angle beam into a generally conical emission space 140 bounded by imaginary lines 142, 144. A sensor means, also identical to the aforementioned sensor means 46, includes an infrared light diode detector 146 which is also mounted on the board 132 and has a field of view or a generally conical sensing space 145 bounded by imaginary lines 148, 150. The sensing space 145 overlaps the emission space 140 at an overlapping region 152 that has upper and lower zones 154, 156. In the preferred embodiment, as before, the lower zone 154 extends from slightly above the top of the dome 126 to a distance of about six inches above the dome, and the upper zone 156 extends from about six inches to about a distance of twelve inches above the dome.

As before, a user's hand positioned anywhere in the overlapping region 152 will reflect light emitted from the light source 134 to an entrance port 158 on the dome and located alongside the exit port 138, and through and along another light column 160, e.g., an optical fiber, to the detector 146. The detector 146 generates an electrical signal indicative of the presence of the object in the overlapping region 152 and, thereupon, the electrical signal is processed into control signals. Each zone 154, 156 has its own control signal. Each control signal is used to drive an indicating assembly which, as illustrated, includes upper and lower lamps or lights 162, 164 mounted at upper and lower elevations within each slave housing. Upper and lower filters 166, 168 of different colors respectively surround the upper and lower lights 162,164. Note that when lower light 164 is lit, the light passes through filter 168 and illuminates only the lower dome portion 130, the upper dome portion 128 being screened by an upper, opaque light baffle 170 on which the upper light 162 is mounted. The lower light 164 is mounted on a lower, opaque light baffle 172. Also, when the upper light 162 is lit, the light passes through filter 166 and illuminates only the upper dome portion 128, the lower dome portion 130 being screened by the light baffle 170.

Turning back to FIG. 2, an on/off switch 74 supplies electrical power to the apparatus. A reset switch 76 may also be used for power resumption. There are seven different operational modes for the apparatus, each mode being visually indicated, when a respective mode is in progress, by the illumination of light emitting diodes 80, 82, 84, 86, 88, 90 and 92. Above each of the aforementioned diodes on the master housing, there are visual aids or prompts 94, 96, 98, 100, 102, 104, 106 which remind the user how to select one of the operational modes, as discussed in detail below.

Turning now to FIG. 5, the illustrated components are mounted on the printed circuit board 32, said components being omitted from FIG. 3 for clarity. It will be noted that the emitter 34 is part of a master emitter circuit 112, the sensor 46 is part of a master sensor circuit 110, and the lights 62, 64 are part of a master indicator circuit 114. The switches 74, 76 and the diodes 80 through 92 are all mounted on the master housing.

A pre-programmed microprocessor 120 is part of the processing means which controls all of these components and performs all of the operations and mode selection described below in the flow charts.

Figure 6:
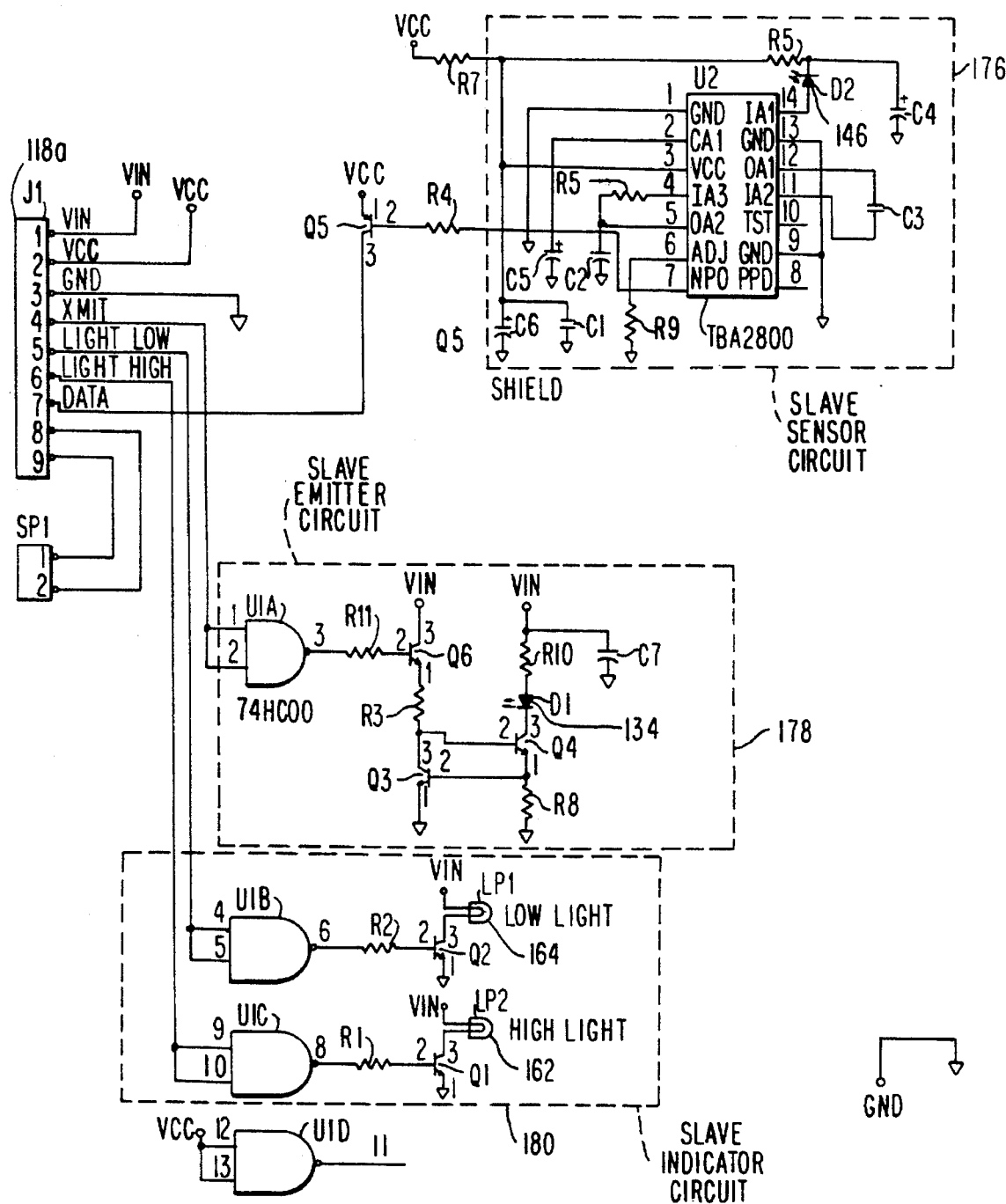
FIG. 6 is a detailed electrical schematic diagram of the circuitry within each slave housing of the apparatus of FIG. 1.
Figure 7:
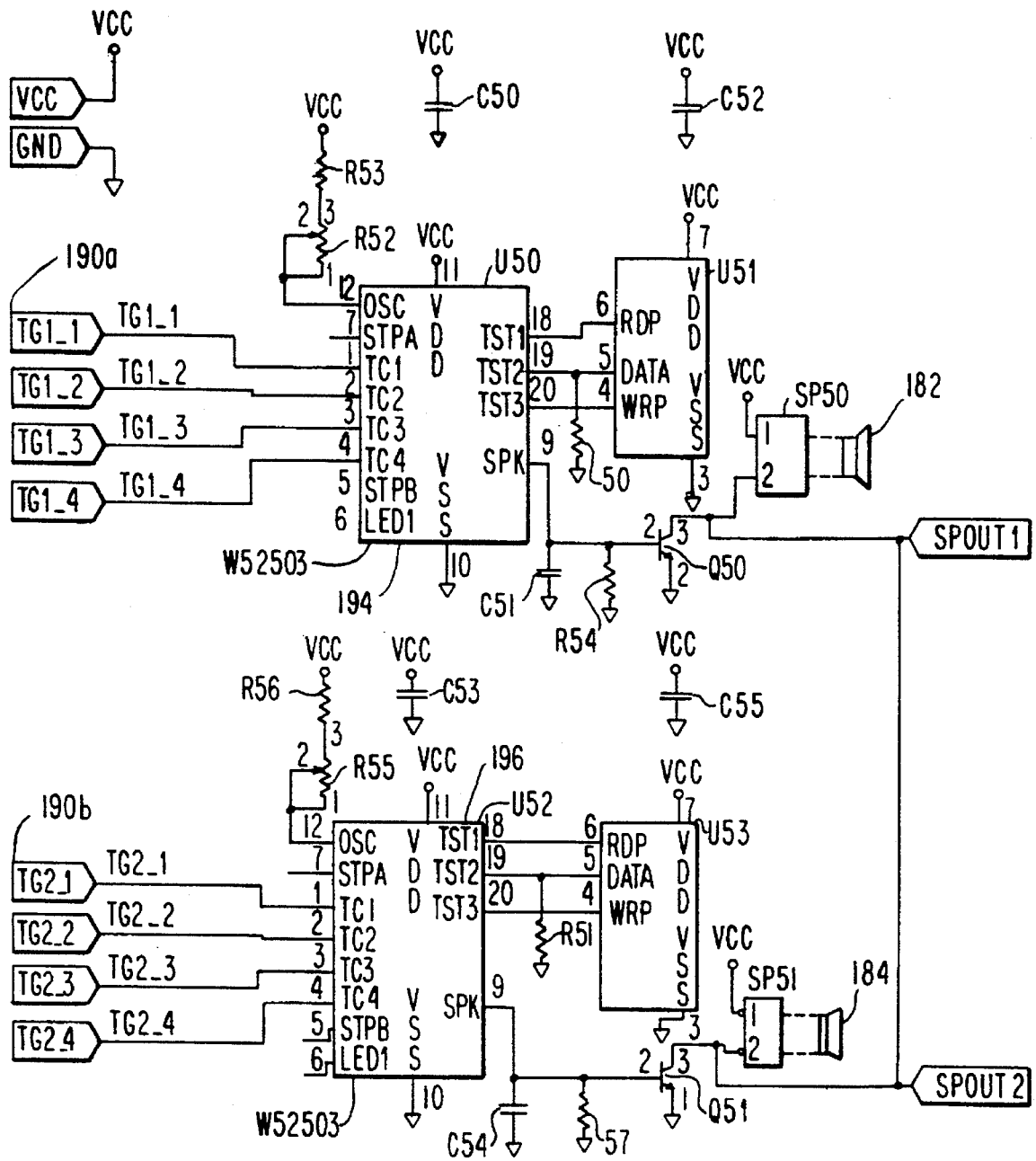
FIG. 7 is an electrical schematic diagram of the sound generating circuitry within the master housing.

The microprocessor has two output terminals 118a, 188b which interconnect the microprocessor 120 to the components in the slave housings. Thus, as shown in FIG. 6, the illustrated components are mounted on each printed circuit board 132, said components being omitted from FIG. 4 for clarity. It will be noted that the emitter 134 is part of a slave emitter circuit 178, the sensor 146 is part of a slave sensor circuit 176, and the lights 162, 164 are part of a slave indicator circuit 180.

Figure 8:
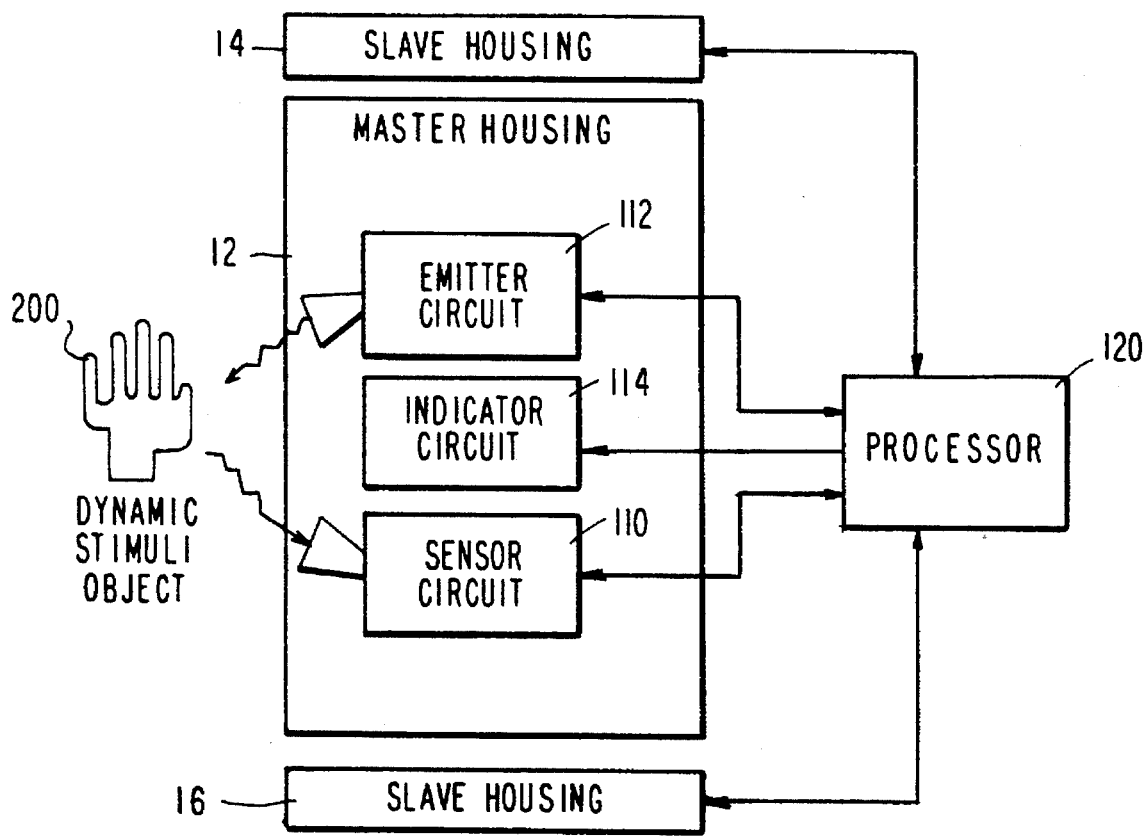
FIG. 8 is a block diagram of electronic circuitry within the apparatus of FIG. 1.

Master housing 112 also has a sound indicating circuit on the printed circuit board 32. A pair of speakers 182, 184 are mounted in the slave housings 14, 16. As best shown in FIGS. 1 and 2, apertured arrangements 186, 188 on the slave housings allow sound to pass therethrough. The microprocessor 120 generates sound control signals at output terminals 190a, 190b to drive sound synthesizers 194, 196 and, in turn, the speakers 182, 184. Depending on the signals that are present on the output terminals 190a, 190b, six different sounds are generated through both speakers in dependence on which zone of which overlapping region is penetrated by the user's hand 200, shown schematically in FIG. 8 in a simplified view of the electronic circuitry.

The microprocessor is programmed, as described in detail in the above-mentioned U.S. patent application Ser. Nos. 08/177,904 and 08/001,058, the entire contents of which are hereby incorporated herein by reference, to sequentially activate the emitter circuits of the housings at successive time intervals which, however, are so short as to give the effect of a continuous operation for the apparatus. In the embodiment illustrated, each emitter is pulsed, typically at about 2,000 pulses per second, to emit light pulses. The corresponding sensor generates an output signal in response to a pulse received, which is also a pulse, the length or duration of which increases with increasing intensity of the radiation received. To distinguish it from the pulses sent by the emitter, it will be called "sensor pulse" or "sensor signal." When the processor activates each emitting circuit, it triggers the emission of the pulses by the emitter. After a certain time, the processor samples the output of the sensor. The time elapsed between the triggering of the emission and the sampling of the sensor output is called "sample delay time (SDT)."

When the processor samples the sensor output, it senses and registers at each sampling whether a sensor signal is still being sent. If the sensor has not received an emitter pulse and, therefore, has not responded by sending a sensor signal, or if it has received a weak emitter pulse and is therefore sent a sensor signal that has lasted less than the time SDT, the processor will register the absence of such a signal (zero). If the sensor has received an emitter pulse strong enough to cause it to emit a sensor signal, the duration of which exceeds SDT, the processor will register the existence of the signal (ONE). The processor will count the number of sensor pulses (ONES) it detects during a given length of time or "measuring cycle." The maximum number of sensor pulses that could be detected during a measuring cycle is equal to the number of emitter pulses that have been sent during the measuring cycle which depends on the duration of the cycle and on the frequency of the emitter pulses. In this example, it is assumed that the maximum number of sensor pulses is 64, corresponding to a duration of each measuring cycle of about 1/30 seconds (more exactly 64/2,000). It is seen that the number of sensor pulses detected in each measuring cycle, which will be called "intensity number (IN)" provides a measure of the intensity of the radiation received by the sensor.

The apparatus calibrates itself in a so-called "zeroing operation". During the zeroing operation, none of the dynamic stimuli that will be applied to the apparatus and to which the apparatus will react in normal operation, are present. In other words, the user's hands are not located above the housings. Thereupon, the emitters begin to emit infrared pulses controlled by the microprocessor. The sensor of each housing will output sensor pulses, and the microprocessor will sample them and compute the IN value by counting the pulses—all as explained previously—and will register the value in its memory, all within a few thousandths of a second (e.g., 30 milliseconds). Since no dynamic stimuli are present during the zeroing operation, this value is a reference threshold value of the sensing parameter IN.

The apparatus is programmed in such a way as to actuate the indicating assemblies, be it lights and/or speakers, to perform their indicating function when the apparatus is subject to a radiation, the intensity of which corresponds to a sensing parameter IN equal to or less than the reference threshold value. Thus, the lights and speakers are activated when at least one sensor receives a radiation more intense than that of the reference value.

It is desirable to control the sensitivity of the apparatus, namely the intensity of the dynamic stimulus that is required in order that the actuated housing will respond. For this purpose, both upper and lower thresholds are established in advance. Thus, the action of a user's hand in penetrating the free space above each housing in a range from about slightly greater than zero inches to about six inches would represent the lower threshold, and the range from about six inches to about twelve inches above each housing would represent the upper threshold.

When the apparatus is used, the user is stationed in front of the housings and moves his or her hands in such a way as to produce dynamic stimuli by creating changes in the radiation received by the sensors in the housings. This occurs because, in the absence of the user, the radiation emitted by the emitters is reflected by the ceiling of the room in which the apparatus is placed, but when the user's hand penetrates the overlapping region and reflects the radiation to a corresponding sensor, the sensor is closer to the emitter than to the ceiling. The closer the reflecting surface is to the emitter, the more intense will the reflected radiation be. The microprocessor will then receive from the sensor so affected, within the measuring cycle, a number of pulses different than that which it receives during the zeroing operation. The processor is so programmed as to send the indicating circuits, whenever this occurs, an appropriate activating instruction, i.e., to light a corresponding light and to sound a corresponding speaker.

As described so far, there are three overlapping regions, one for each housing, and two zones in each overlapping region. The processor 120 is programmed to detect which region and which zone has been penetrated by the user and to responsively activate the lights and speakers with distinctively colored lights and differently pitched sounds. This detection feature is used not only to operate the apparatus in its various operational modes, but also to select the operational mode to be used.

Figure 9:
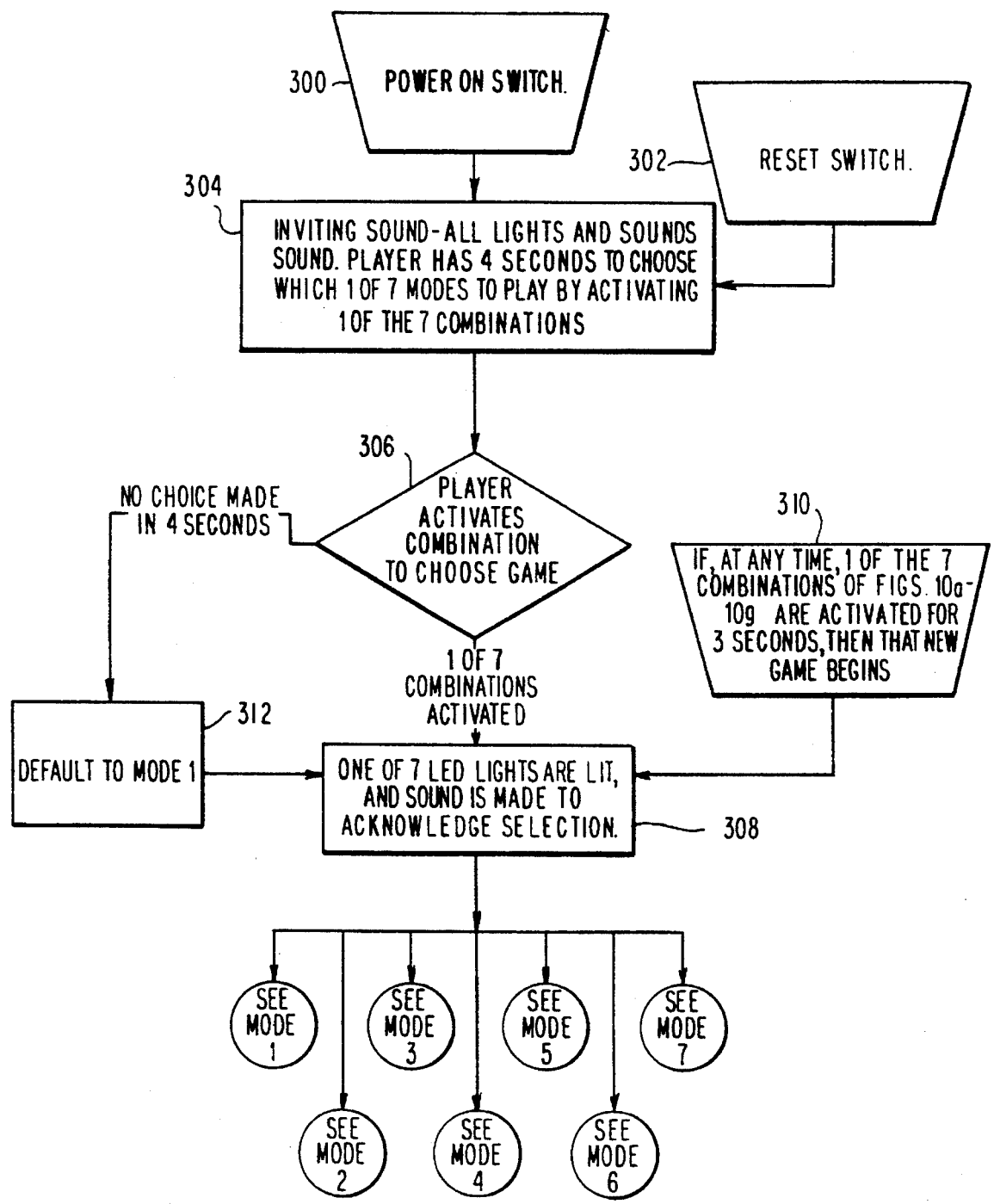
FIG. 9 is a flow chart generally showing the start-up operation for the apparatus of FIG. 1.
Figure 10A:
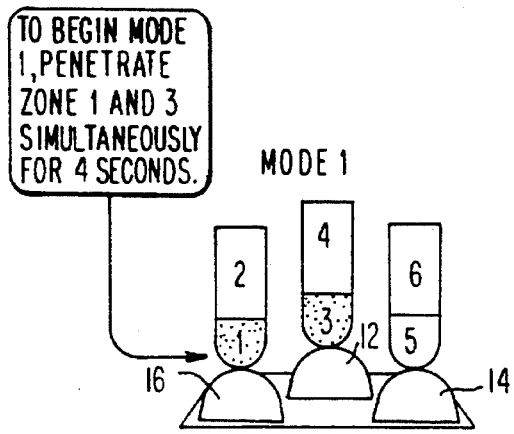
FIGS. 10a, 10b, 10c, 10d, 10e, 10f and 10g are diagrams showing how a first, second, third, fourth, fifth, sixth and seventh, operational mode is selected.
Figure 10B:
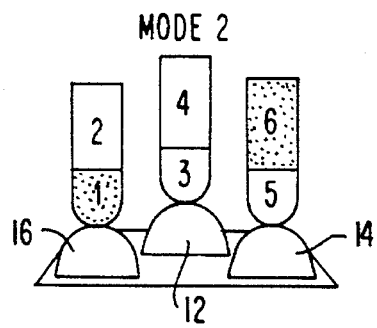
Figure 10C:
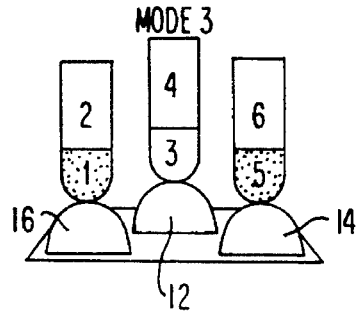
Figure 10D:
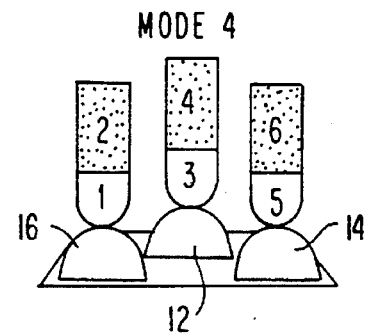
Figure 10E:
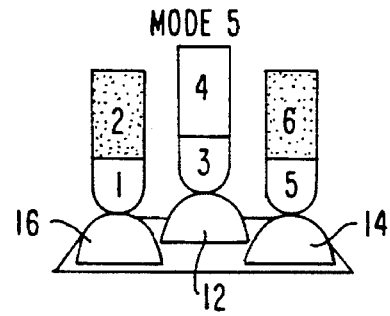
Figure 10F:
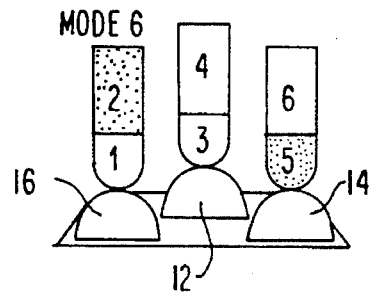
Figure 10G:
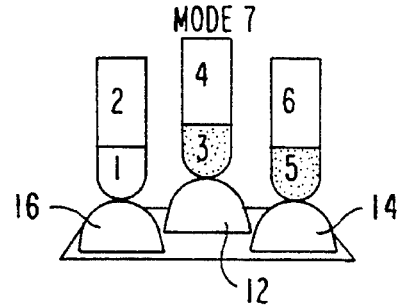

FIG. 9 depicts the start-up operation. When power is switched on at block 300, or when power is switched on by the reset switch at block 302, an inviting sound is generated at block 304 wherein all lights and all sounds are generated. The user now has a predetermined time, e.g., four seconds, in which to choose one of the seven operational modes of play by activating one of the seven combinations of hand positions illustrated in FIGS. 10a through 10f. If the user activates one of these combinations within the predetermined time period at block 306, then one of the seven light emitting diodes 82–92 is lit at block 308 and, with the selection of one of the operational modes, then that operational mode, as set forth in FIGS. 11 through 16, is performed. If, at any time during the playing of an operational mode, one of the seven combinations shown in FIGS. 10a through 10g are activated for three seconds, then that new operational mode begins (see block 310). If, however, a combination is not selected within the predetermined time, then the apparatus will default to operational mode 1 (FIG. 10a); see block 312.

In FIGS. 10a through 10g, the lower and upper zones of the overlapping region above slave housing 16 is represented by the numerals 1 and 2; the lower and upper zones of the overlapping region above the master housing 12 is represented by the numerals 3 and 4; and the lower and upper zones of the overlapping region above the slave housing 14 is represented by the numerals 5 and 6. The first operational mode is selected (see FIG. 10a) by placing one's hands in zones 1 and 3 simultaneously. The second operational mode is selected (see FIG. 10b) by placing one's hands in zones 1 and 6 simultaneously. The third operational mode is selected (see FIG. 10c) by placing one's hands in zones 1 and 5 simultaneously. The fourth operational mode is selected (see FIG. 10d) by placing one's hands in zones 2, 4 and 6 simultaneously. The fifth operational mode is selected (see FIG. 10e) by placing one's hands in zones 2 and 6 simultaneously. The sixth operational mode is selected (see FIG. 10f) by placing one's hands in zones 2 and 5 simultaneously. The seventh operational mode, which is the same as the first operational mode, is selected (see FIG. 10g) by placing one's hands in zones 3 and 5 simultaneously.

All of the above hand positions are visibly depicted on the master housing itself by visual aids 94 through 106.

Figure 11:
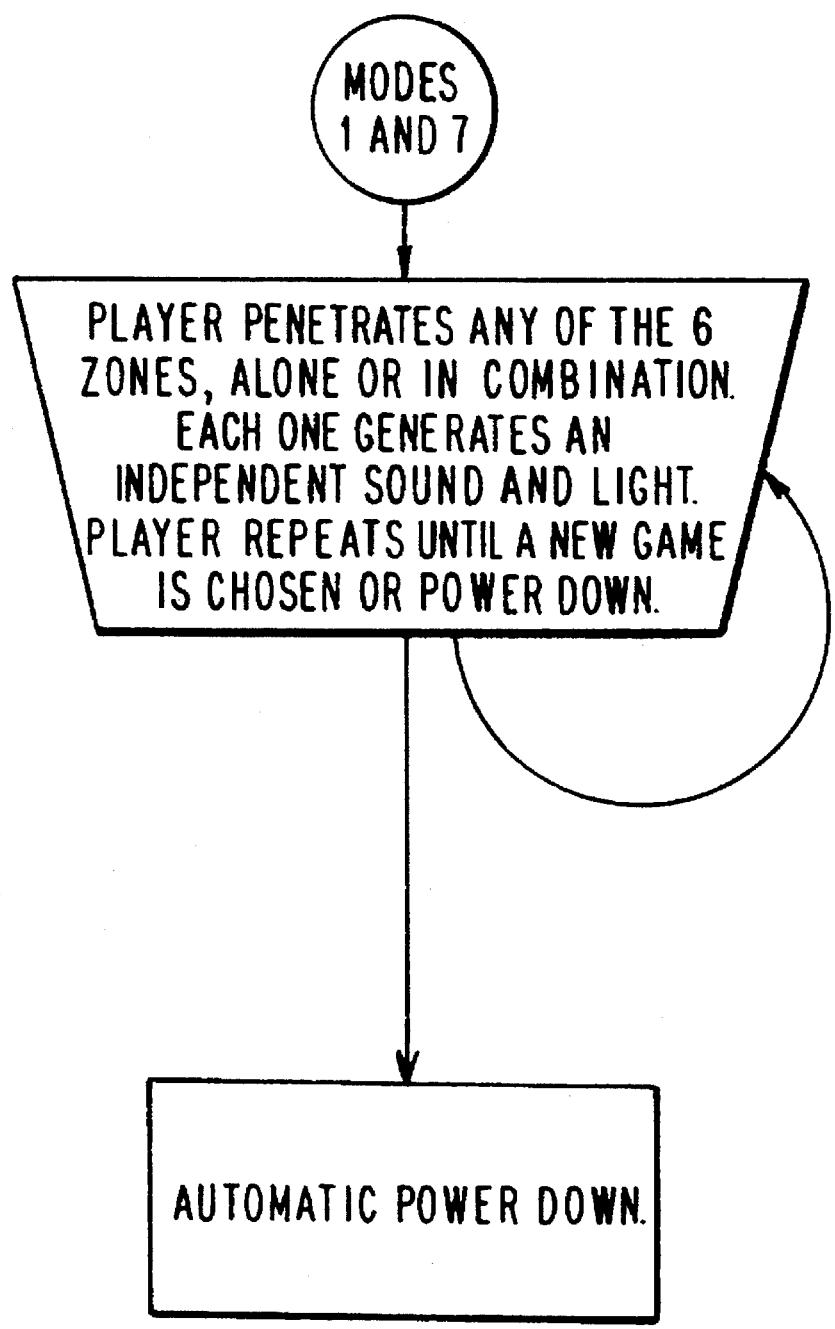
FIG. 11 is a flow chart showing the steps in the first and seventh operational modes of FIGS. 10a, 10g.

FIG. 11 depicts the first and seventh operational modes in which the user plays freely, generating sounds and lights of his or her choice.

Figure 12:
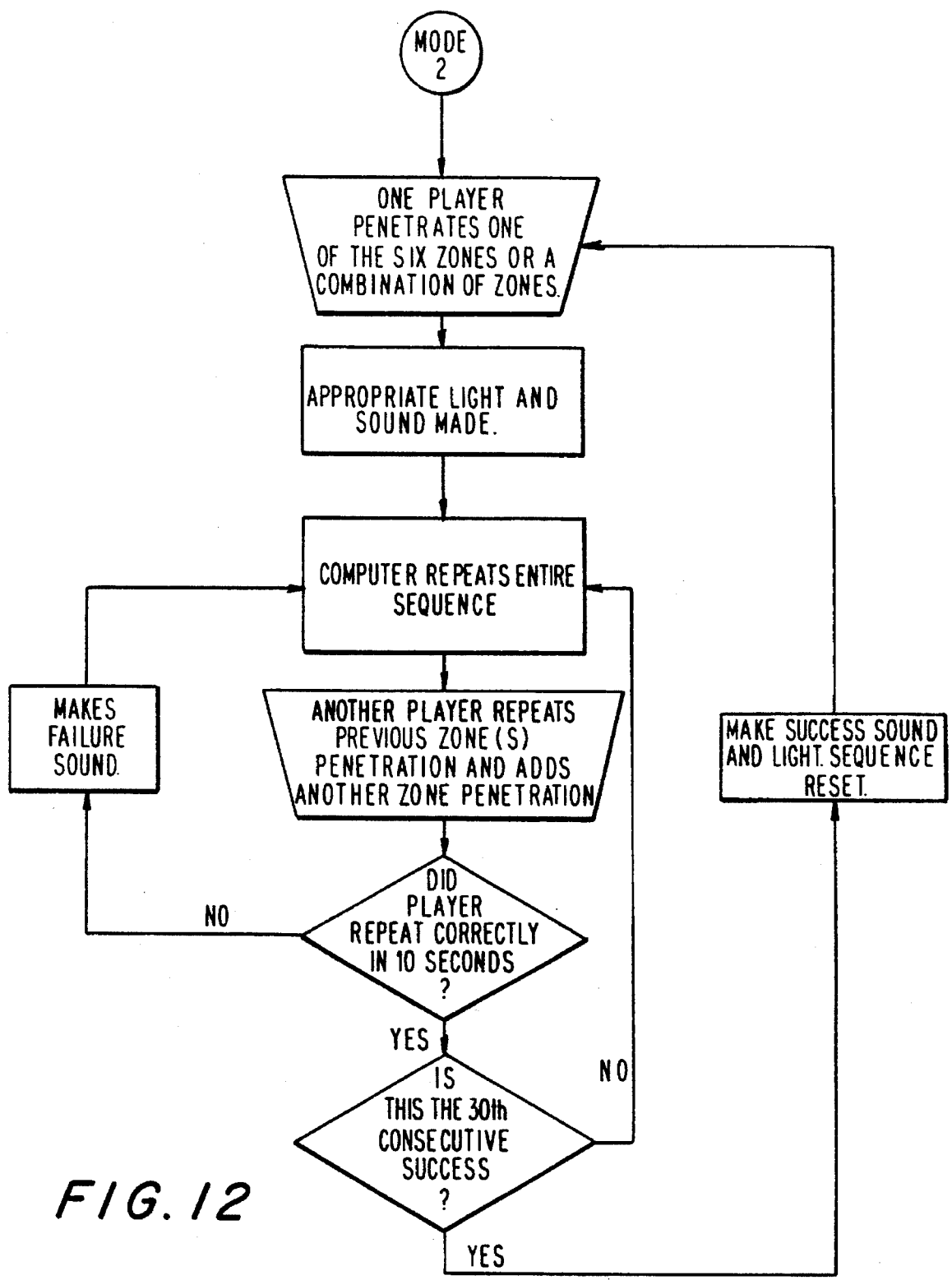
FIG. 12, 13, 14, 15 and 16 are flow charts showing the steps in the second, third, fourth, fifth and sixth, operational modes of FIGS. 10b, 10c, 10d, 10e and 10f.

FIG. 12 depicts the second operational mode in which one player makes a single or combination move, followed by the same or another player making another move, thereby adding to a sequence of moves. The players repeat and add a new move after each successful sequence. The sequence is not cleared after an unsuccessful move.

Figure 13:
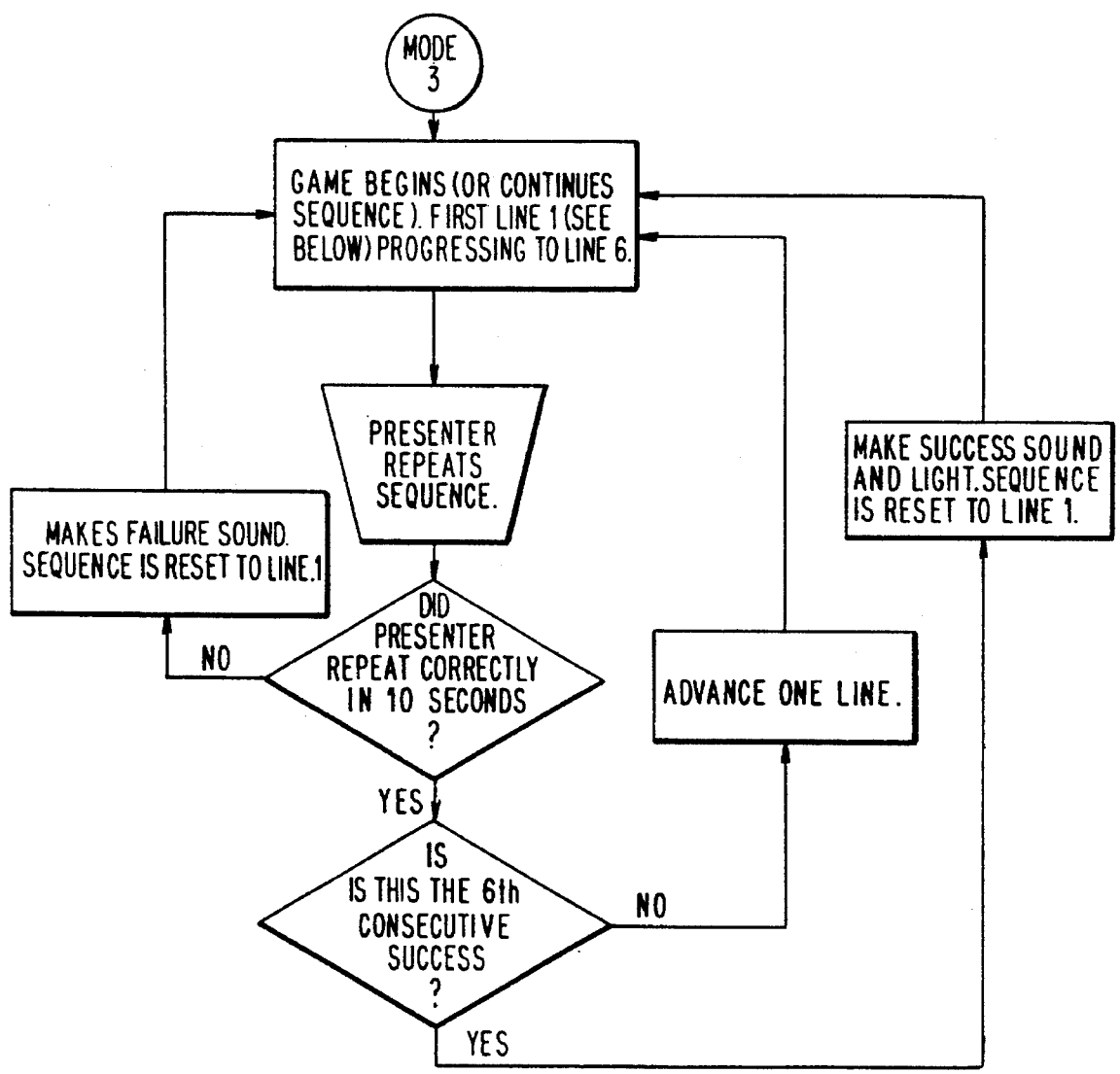

FIG. 13 depicts the third operational mode which is the same as the fifth operational mode described below, except that a predetermined sequence of moves, either singly or in combination, is generated to allow the user to give a good presentation of lights and sounds. The predetermined sequence of moves is set forth in FIG. 13.

Figure 14:
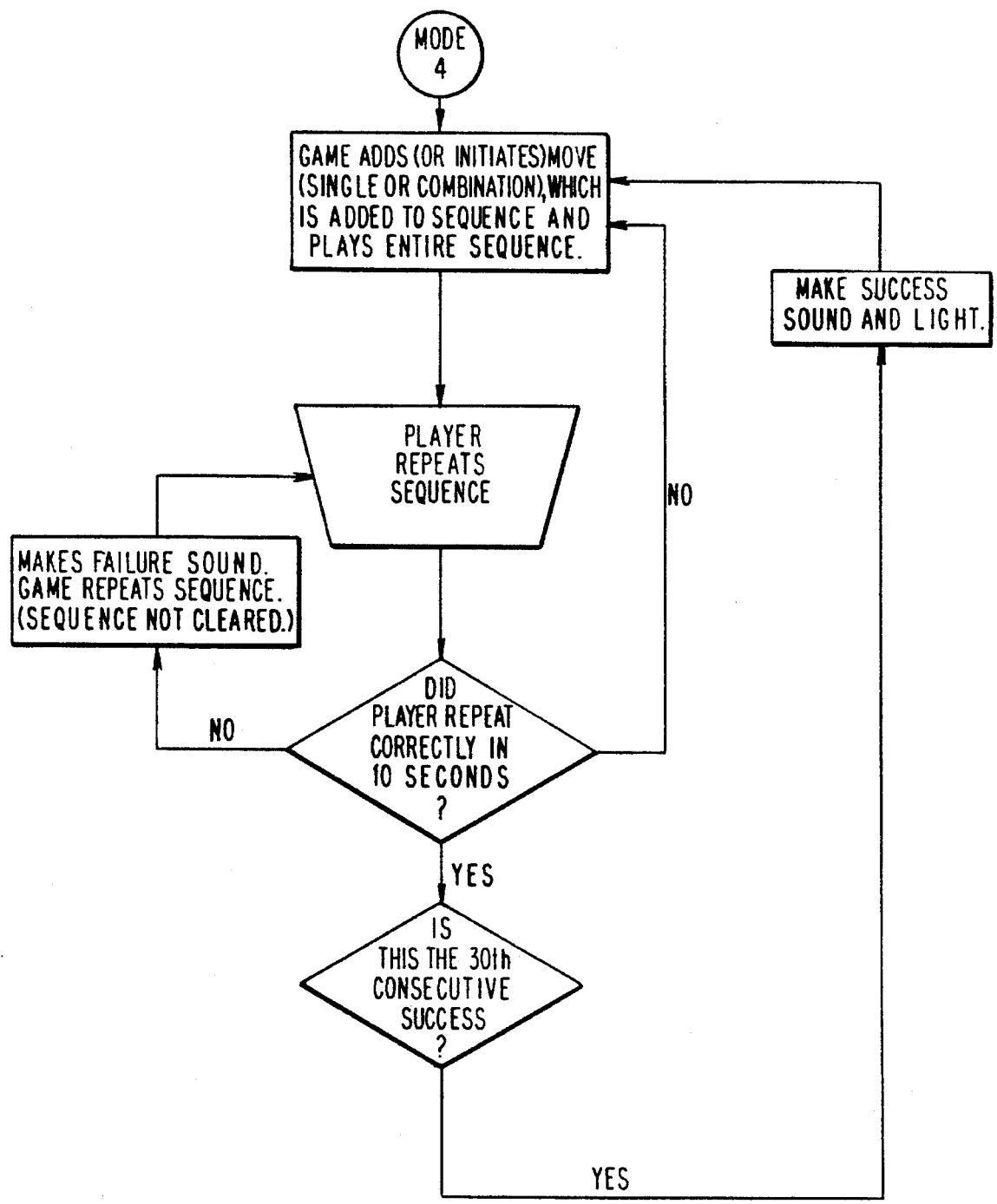

FIG. 14 depicts the fourth operational mode in which the microprocessor itself makes a random move either singly or in combination. Thereupon, the player repeats. If correct, the microprocessor adds another single or combination move, whereupon the player repeats the last sequence. The microprocessor and the player alternate as the sequence builds. If the player makes a mistake, then the sequence is not cleared.

Figure 15:
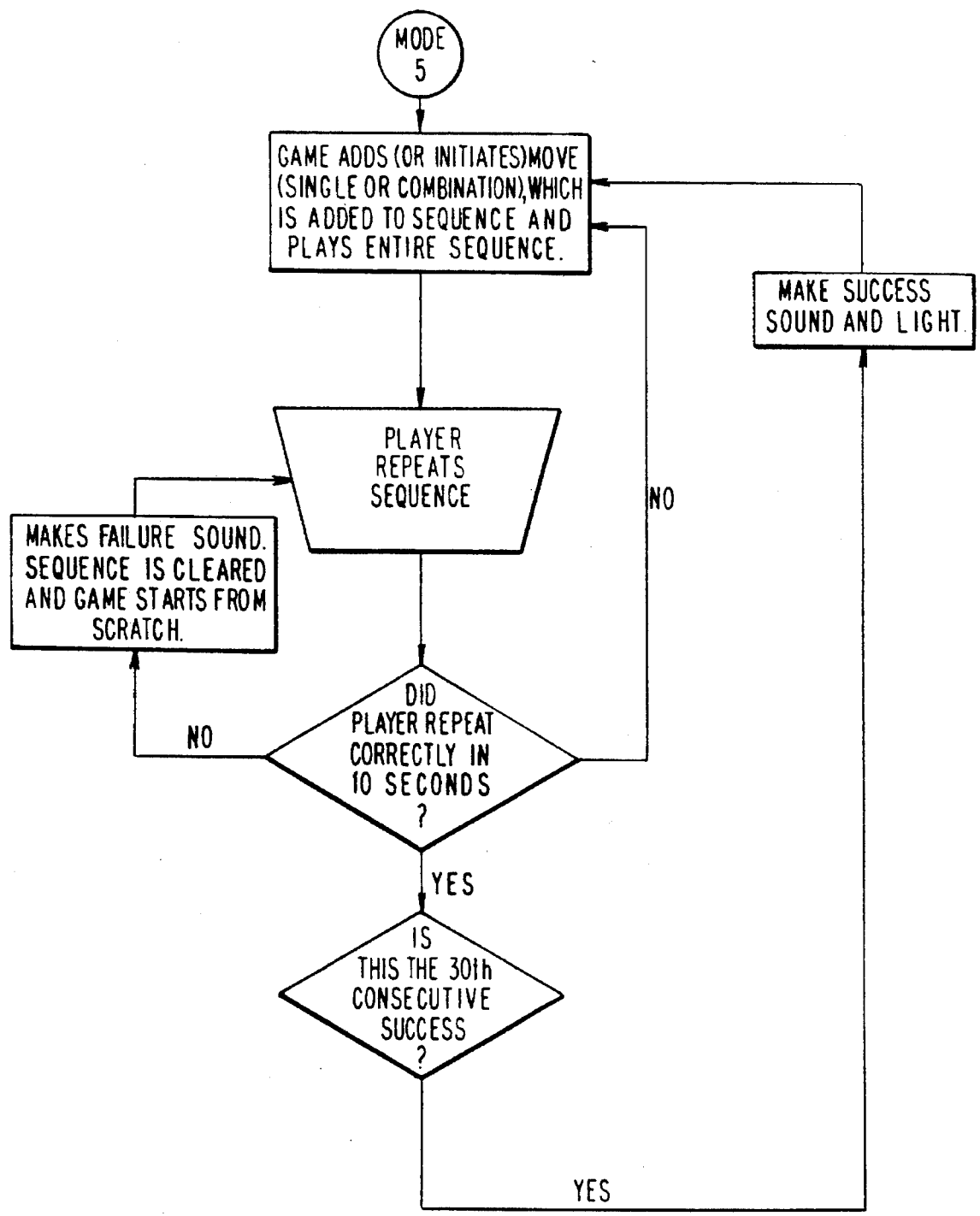

FIG. 15 depicts the fifth operational mode which is the same as the fourth operational mode, except that the sequence is cleared if the player makes a mistake.

Figure 16:
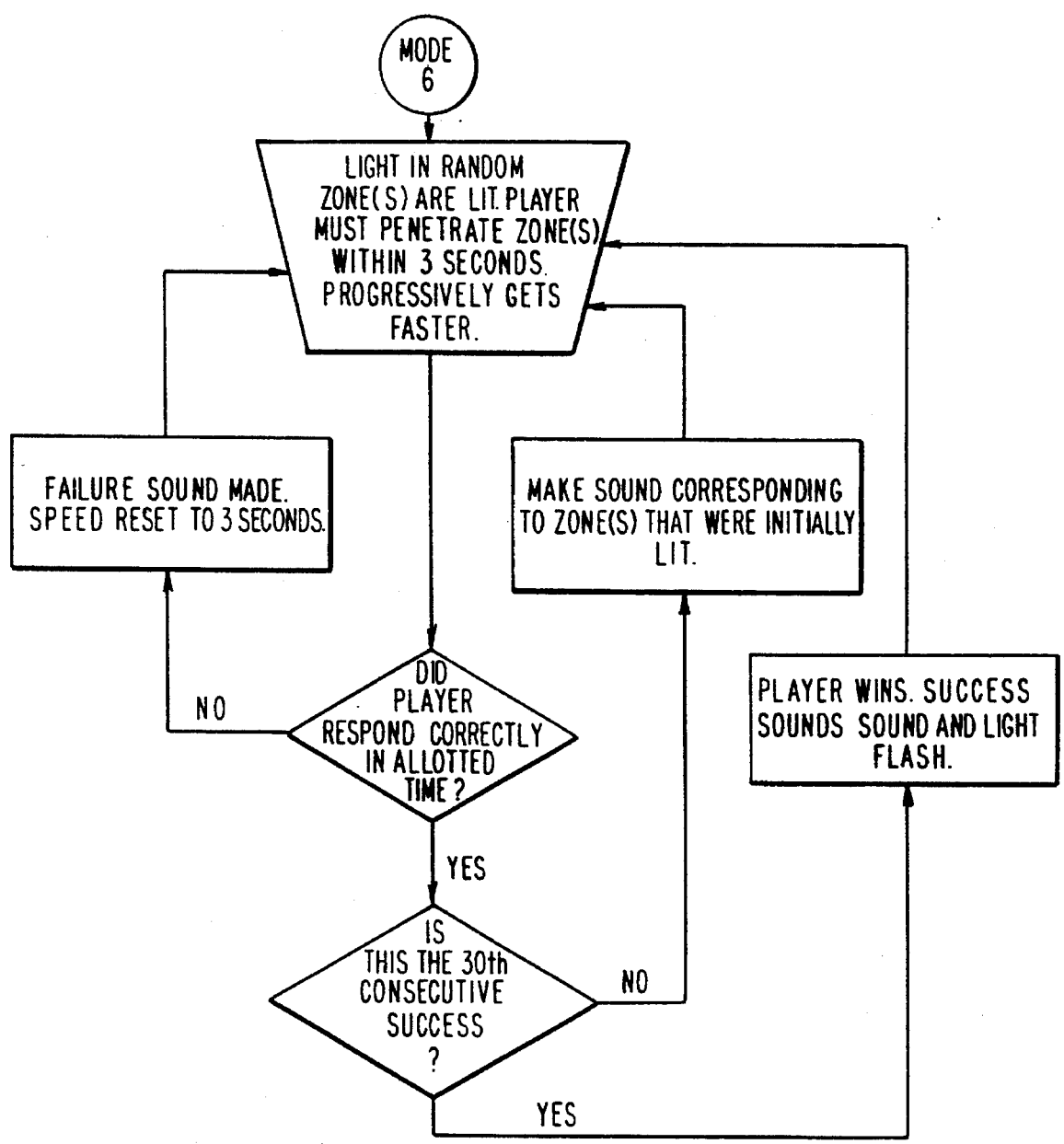

FIG. 16 depicts a sixth operational mode in which the microprocessor generates either single or combination random moves, thereby inviting the player to emulate the last sequence within an allotted time. The microprocessor is programmed to get more challenging, and the player is given progressively less time to emulate the last sequence.

There are many variations that are envisioned by the present invention. Thus, the invention need not be limited to three housings since one or more housings may be utilized. Also, this invention need not be restricted to two bulbs in each housing, or to two speakers.

It will be understood that each of the elements described above, or two or more together, also may find a useful application in other types of constructions differing from the types described above.

While the invention has been illustrated and described as embodied in an action apparatus for and a method with non-contact mode selection and operation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

What is claimed as new and desired to be protected by Letters Patent is set forth in the appended claims.

We claim:

1. A multi-mode action apparatus, comprising:
   a) a support;
   b) sensor means supported by the support, for sensing an object movable in free space relative to the support; and
   c) control means operatively connected to the sensor means, said control means being programmed with a plurality of human operator-interactive, operational modes having differing sequences of object positions of the object for execution by a human operator, said control means being further programmed with a corresponding plurality of differing launch positions of the object relative to, and out of contact with, the support, said control means being operative for recognizing one of the launch positions selected by the operator, and for launching the operational mode corresponding to said selected one launch position.

2. The apparatus according to claim 1; and further comprising emitter means for transmitting radiation away from the support into an emission space; and wherein the sensor means has a sensing space that at least partially overlaps the emission space in an overlapping region, said sensor means being operative for receiving radiation directed by the object located in said overlapping region, and for generating an electrical signal indicative of the presence of the object in said overlapping region; and further comprising indicator means responsive to the generation of the electrical signal for indicating the presence of the object.

3. The apparatus according to claim 2, wherein the support includes a housing having exit and entrance ports alongside each other, and wherein the emitter means includes a light source for emitting a light beam through the exit port into the emission space, and wherein the sensor means includes a light detector for detecting light from the light beam reflected off the object and entering the entrance port.

4. The apparatus according to claim 3, wherein the emission and sensing spaces having generally conical volumes substantially overlapping each other.

5. The apparatus of claim 3, wherein the light beam is substantially invisible to the human eye.

6. The apparatus according to claim 2, wherein the control means includes means for processing the electrical signal to generate one of a first control signal indicative of a first range of distances of the object from the support, and a second control signal indicative of a second range of distances of the object from the support; and wherein the indicator means generates different indications for different control signals.

7. The apparatus according to claim 6, wherein the emitter means is a pulsatable light source, and the control means includes means for pulsing the light source to generate a number of light pulses in a given time interval to obtain an actual pulse count; and wherein the processing means includes means for comparing the actual pulse count with a reference count to generate the first control signal when the actual pulse count is greater than the reference count, and the second control signal when the actual pulse count is less than the reference count.

8. The apparatus according to claim 7, wherein the first range of distances is greater than zero and less than about six inches above the support, and wherein the second range of distance is about six inches to about twelve inches above the support.

9. The apparatus according to claim 1, wherein the control means includes means for determining an actual distance at which the object is located away from the support, and means for comparing the actual distance with a predetermined range of distances to select said operational mode when the actual distance falls within said predetermined range of distances.

10. The apparatus according to claim 9, wherein the determining means detects a pair of actual distances at which two objects are simultaneously located away from the support, and wherein the comparing means compares the actual distances with a pair of predetermined ranges of distances to select said operational mode when the actual distances respectively fall within said predetermined ranges of distances.

11. The apparatus according to claim 2, wherein the support includes a master housing and a pair of slave housings, each housing having a pair of exit and entrance ports; and wherein the emitter means includes three light sources, one on each housing, for emitting respective light beams through respective exit ports into respective emission spaces above the respective housings; and wherein the sensor means includes three light detectors, one on each housing, having respective sensing spaces above the respective housings and at least partially overlapping the respective emission spaces in respective overlapping regions, each detector being operative for detecting light from a respective light beam reflected off the object located in a respective overlapping region, said detectors being operative for generating different electrical signals; and wherein the indicator means includes three indicating assemblies, one on each housing, for generating different indications in response to the generation of the different electrical signals.

12. The apparatus according to claim 11, wherein the control means includes means for processing a respective electrical signal to generate one of a first control signal indicative of a first range of distances of the object above a respective housing, and a second control signal indicative of a second range of distances of the object above the respective housing; and wherein the indicating assembly on the respective housing includes a pair of bulbs each lit by a respective control signal, and a speaker concomitantly annunciated by the respective control signal.

13. The apparatus according to claim 11, wherein the slave housings are electrically connected to, and movable relative to, the master housing.

14. The apparatus according to claim 12, wherein each housing has a dome with upper and lower, light-transmissive portions; and wherein the bulbs include upper and lower bulbs mounted at upper and lower elevations within a respective housing; and wherein each indicating assembly includes upper and lower, differently colored filters respectively surrounding the upper and lower bulbs, and operative for differently coloring the light emitted by the bulbs to illuminate the upper and lower dome portions with differently colored light.

15. The apparatus according to claim 1; and timber comprising means for emitting a plurality of light beams spaced apart of each other along, and extending into a plurality of emission spaces away from, the support; and wherein the sensor means is operative for detecting reflected light off objects in a plurality of sensing spaces spaced apart of each other along, and extending away from, the support; said sensing spaces at least partially respectively overlapping the emission spaces in a plurality of overlapping regions; and wherein the control means is operative for determining the specific overlapping region in which each object is located, and the distance of each object relative to the support; and further comprising indicator means for indicating said distance and specific overlapping region.

16. The apparatus according to claim 15, wherein the control means includes a controller for controlling the indicator means, in a first operational mode, for generating different indications in dependence on the determination of said distance and specific overlapping region.

17. The apparatus according to claim 16, wherein the controller is operative, in another operational mode, for storing progressive sequences of said different indications, and for generating a success signal when the last sequence is successfully emulated.

18. The apparatus according to claim 16, wherein the controller is operative, in another operational mode, for generating a predetermined sequence of said different indications, and for generating a success signal when the predetermined sequence is successfully emulated.

19. The apparatus according to claim 16, wherein the controller is operative, in another operational mode, for generating one indication, and a success signal when said one indication is successfully emulated, and thereupon for generating a sequence of said one indication followed by a new indication, and another success signal when said sequence of said one and new indications are successfully emulated.

20. The apparatus according to claim 19, wherein the controller repeats said sequence when said sequence is not successfully emulated.

21. The apparatus according to claim 19, wherein the controller clears said sequence when said sequence is not successfully emulated within a predetermined time period.

22. The apparatus according to claim 1; and further comprising visual aids on the support, for prompting a user to position an object relative to the support in order to select said operational mode.

23. An action apparatus, comprising:
a) a support;
b) sensor means supported by the support, for sensing an object movable in free space relative to the support; and
c) control means operatively connected to the sensor means, said control means being programmed with a plurality of human operator-interactive, operational modes having differing sequences of object positions of the object for execution by a human operator, said control means being further programmed with a corresponding plurality of differing response positions of the object relative to, and out of contact with, the support, said control means, in at least one of the modes, being operative for independently generating a human-perceptible prompting signal to prompt the operator to respond with a predetermined one of the response positions, and for recognizing the predetermined response position selected by the operator.

24. The apparatus according to claim 23, wherein the prompting signal is an audiovisual signal.

25. A multi-mode selection method, comprising the steps of:
a) programming a controller with a plurality of human operator-interactive, operational modes having differing sequences of object positions of an object movable relative to a support for execution by a human operator;
b) further programming the controller with a corresponding plurality of differing launch positions of the object relative to, and out of contact with, the support;
c) recognizing one of the launch positions selected by the operator; and
d) launching the operational mode corresponding to said selected one launch position.

26. An action emulation method, comprising the steps of:
a) programming a controller with a plurality of human operator-interactive, operational modes having differing sequences of object positions of an object movable relative to a support for execution by a human operator;
b) further programming the controller with a corresponding plurality of differing response positions of the object relative to, and out of contact with, the support;
c) independently generating in at least one of the modes, a human-perceptible prompting signal to prompt the operator to respond with a predetermined one of the response positions; and
d) recognizing the predetermined response position selected by the operator.

* * * * *